(12) United States Patent
Woo

(10) Patent No.: US 8,698,983 B2
(45) Date of Patent: Apr. 15, 2014

(54) LIQUID CRYSTAL DISPLAY DEVICE

(75) Inventor: Jong Hoon Woo, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 77 days.

(21) Appl. No.: 13/327,433

(22) Filed: Dec. 15, 2011

(65) Prior Publication Data

US 2012/0162582 A1 Jun. 28, 2012

(30) Foreign Application Priority Data

Dec. 28, 2010 (KR) .................. 10-2010-0137066

(51) Int. Cl.
*G02F 1/1335* (2006.01)
(52) U.S. Cl.
USPC ............... 349/98; 349/96; 349/106; 349/117
(58) Field of Classification Search
USPC .............. 349/106, 96, 108, 98, 97, 117
See application file for complete search history.

(56) References Cited

U.S. PATENT DOCUMENTS

| | | | | |
|---|---|---|---|---|
| 4,688,897 A | * | 8/1987 | Grinberg et al. | 349/162 |
| 6,292,439 B1 | * | 9/2001 | Akiba et al. | 368/84 |
| 7,072,013 B2 | * | 7/2006 | Yoon | 349/115 |
| 7,342,623 B2 | * | 3/2008 | Ishizaki | 349/114 |

FOREIGN PATENT DOCUMENTS

| | | |
|---|---|---|
| CN | 1375727 A | 10/2002 |
| CN | 1576993 A | 2/2005 |
| CN | 101052899 A | 10/2007 |

OTHER PUBLICATIONS

Office Action issued in corresponding Chinese Patent Application No. 201110445894.1, mailed Dec. 26, 2013, 13 pages.

* cited by examiner

*Primary Examiner* — Thoi Duong
(74) *Attorney, Agent, or Firm* — Brinks Gilson & Lione

(57) ABSTRACT

An LCD device is disclosed which includes: a first substrate; a second substrate disposed to face the first substrate; a liquid crystal layer inserted between the first and second substrates; a cholesteric color filter layer disposed on the first substrate; and an auxiliary color filter layer disposed on the cholesteric color filter layer and formed to transmit a fixed wavelength band of light progressing in a front viewing direction of the cholesteric color filter layer and filter every wavelength band of light progressing in a side viewing direction of the cholesteric color filter layer except the fixed wavelength band of light.

8 Claims, 4 Drawing Sheets

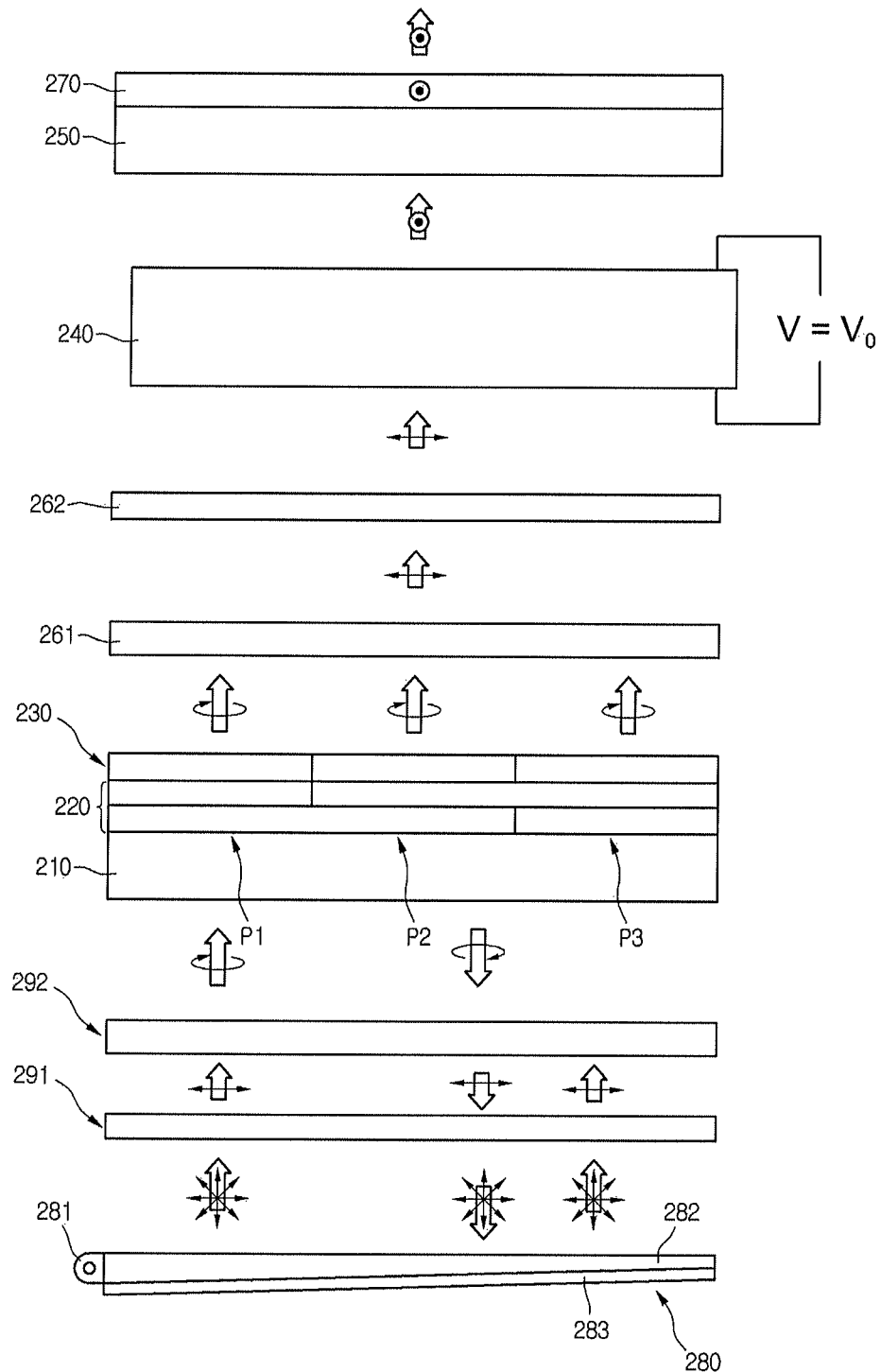

LIQUID CRYSTAL DISPLAY DEVICE

CROSS-REFERENCE TO RELATED APPLICATION

This application claims priority under 35 U.S.C. 119 to Korean Patent Application No. 10-2010-0137066, filed on Dec. 28, 2010, which is hereby incorporated by reference in its entirety.

BACKGROUND

1. Field of the Disclosure

This disclosure relates to a liquid crystal display (LCD) device, and more particularly to an LCD device with a cholesteric color filter layer.

2. Description of the Related Art

Recently, LCD devices are being widely used in the display industrial field, because of features such as low power consumption, thin thickness and so on. Such LCD devices control light transmittances of liquid crystal cells according to a video signal and display an image.

However, there is a problem of low light efficiency in the LCD device. This results from the fact that a color filter and a polarizing film included in the LCD device have low light transmittances. Particularly, the color filter absorbs all wavelength bands of light except a transmission wavelength band. As such, light transmittance of the color filter can greatly deteriorate. Actually, a red layer of the color filter transmits only a red wavelength band of light, but absorbs green and blue wavelength bands of light. Due to this, only one-third of white light can be used for displaying an image.

In view of this point, it is necessary to develop a new color filter capable of enhancing the light efficiency of the LCD device.

SUMMARY

An LCD device according to one general aspect of the present disclosure is provided. The LCD device includes: a first substrate; a second substrate disposed to face the first substrate; a liquid crystal layer inserted between the first and second substrates; a cholesteric color filter layer disposed on the first substrate; and an auxiliary color filter layer disposed on the cholesteric color filter layer and formed to transmit a fixed wavelength band of light progressing in a front viewing direction of the cholesteric color filter layer and filter every wavelength band of light progressing in a side viewing direction of the cholesteric color filter layer except the fixed wavelength band of light.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings:

FIG. 5 is a cross-sectional view illustrating the polarization status of light in the LCD device when white is realized.

DETAILED DESCRIPTION

Figure 1:
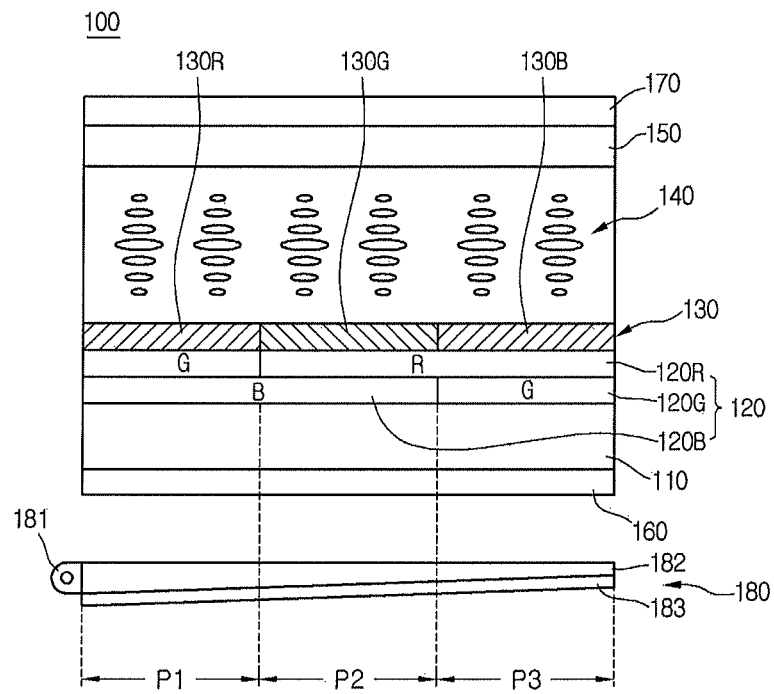
FIG. 1 is a cross-sectional view schematically showing an LCD device according to a first embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art.

Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

FIG. 1 is a cross-sectional view schematically showing an LCD device according to a first embodiment of the present disclosure;

Referring to FIG. 1, the LCD device 100 according to the first embodiment of the present disclosure can include a first substrate 110, a cholesteric color filter layer 120, an auxiliary color filter layer 130, a liquid crystal layer 140, and a second substrate 150.

The first substrate 110 is formed from a light transmittable material. For example, the first substrate 110 can be formed from one of glass and plastic.

Such a first substrate 110 can include a plurality of pixels which are a minimum unit for displaying an image. The plurality of pixels can include first through third pixels P1 through P3 which are used for realizing a variety of colors.

The cholesteric color filter layer 120 can be disposed on the first substrate 110. The cholesteric color filter layer 120 includes liquid crystal molecules arranged in a spiral. As such, the cholesteric color filter layer 120 reflects circularly polarized light oriented in the same direction as the spiral arrangement, but transmits circularly polarized light in a different direction from the spiral arrangement. For example, if the spiral arrangement of molecules orients on the right side, the cholesteric color filter layer 120 reflects right-circularly polarized light but transmits left-circularly polarized light. On the contrary, when the spiral arrangement orients toward the left side, the cholesteric color filter layer 120 reflects left-circularly polarized light but transmits right-circularly polarized light.

Reflected circularly-polarized-light can re-enter the cholesteric color filter layer 10 by being re-reflected by a reflective medium, such as a reflective plate 183 of a backlight unit 180, which can exist under the cholesteric color filter layer 120. At this time, light re-reflected by the reflective plate 183 can be transmitted through the cholesteric color filter layer 120 by being polarized at the re-reflection. As such, light loss can be minimized. Therefore, the cholesteric color filter layer 120 can provide a higher light efficiency compared to the light absorbing color filter layer of the related art.

The cholesteric color filter layer can be formed to include two stacked cholesteric color filters, in order to realize one of red, green and blue colors. For example, a cholesteric color filter layer 120 of the first pixel P1 can be formed in a stacked structure of a green cholesteric color filter 120G and a blue cholesteric color filter 120B. The green cholesteric color filter 120G reflects light corresponding to a green wavelength band, and the blue cholesteric color filter 120B reflects light corresponding to a blue wavelength band. As such, the cholesteric color filter layer 120 of the first pixel P1 can transmit a red wavelength band of light by reflecting the green wavelength band of light and the blue wavelength band of light. Therefore, the cholesteric color filter layer 120 of the first pixel P1 can realize a red color.

In a similar manner, a cholesteric color filter layer 120 of the second pixel P2 can be formed in another stacked structure of red and blue cholesteric color filters 120R and 120B reflecting the respective red and blue wave bands of lights. As such, the cholesteric color filter layer 120 of the second pixel P2 can transmit the green wavelength band of light by reflecting the red and blue wavelength bands of lights. Therefore, the cholesteric color filter layer 120 of the second pixel P2 can realize a green color.

Also, a cholesteric color filter layer 120 of the third pixel P3 can be formed in still another stacked structure of red and green cholesteric color filters 120R and 120G reflecting the respective red and green wave bands of lights. As such, the cholesteric color filter layer 120 of the third pixel P3 can transmit the blue wavelength band of light by reflecting the red and green wavelength bands of lights. Therefore, the cholesteric color filter layer 120 of the third pixel P3 can realize a blue color.

Such a cholesteric color filter layer 120 can provide an effect of enhancing a light transmittance, but causes a problem of deteriorating a color reproductive ratio in accordance with a viewing angle. This results from the fact that a color shift phenomenon is caused by using the cholesteric color filter layer 120. The color shift phenomenon will now be explained in detail referring to FIG. 2.

Figure 2:
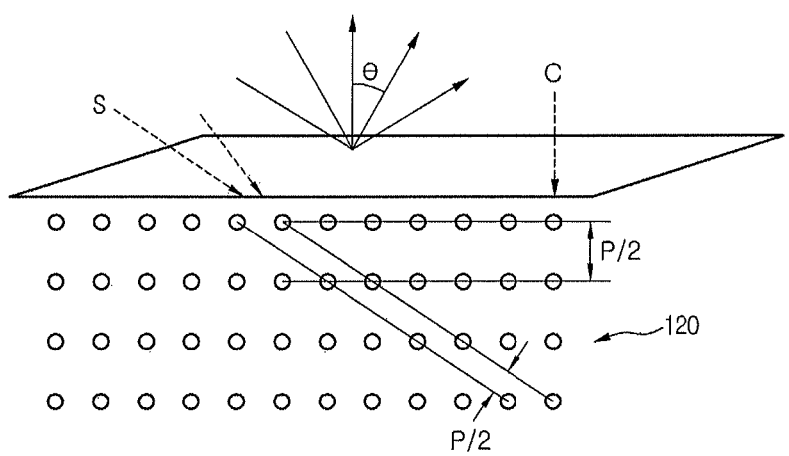
FIG. 2 is a view illustrating a color shift phenomenon caused by using a cholesteric color filter.

FIG. 2 is a view illustrating a color shift phenomenon caused by using a cholesteric color filter.

Referring to FIG. 2, the cholesteric color filter layer 120 can reflect light having a wavelength which is defined by an equation 1 as follows.

$$\lambda = \frac{P}{2} * n \qquad \text{[Equation 1]}$$

In the equation 1, "P" is a pitch, i.e., the size of one twist period in the spiral arrangement (or structure) of the liquid crystal molecules and "n" is an integral number.

A half pitch P/2 at a front viewing angle C of the cholesteric color filter layer 120 can become shorter compared to another half pitch at a side viewing angle S of the cholesteric color filter layer 120. In other words, the larger the side viewing angle S of the cholesteric color filter layer 120 becomes, the shorter the half pitch can become. As such, different wavelengths of light can be reflected at the front and side viewing angles of the cholesteric color filter layer 120. Due to this, the color shift can be caused. In accordance therewith, the color reproductive ratio can deteriorate.

Returning to FIG. 1, the auxiliary color filter layer 130 can be used for preventing the color shift in accordance with the viewing angle of the cholesteric color filter layer 120. To this end, the auxiliary color filter layer 130 is disposed on the cholesteric color filter layer 120.

The auxiliary color filter layer 130 re-transmits light being transmitted through the cholesteric color filter layer 120 so that only a desired wavelength band of light can be transmitted through. As such, the generation of the color shift in accordance with the viewing angle can be prevented. In other words, the auxiliary color filter layer 130 can perform a function of not only transmitting a fixed wavelength band of light progressing in just the front direction of the cholesteric color filter layer 120 and filtering every wavelength band of light except the fixed wavelength band of light which are progressing to the side viewing angles of the cholesteric color filter layer 120.

Such an auxiliary color filter layer 130 can be configured with color filter films formed to each include a pigment and a resin. More specifically, the auxiliary color filter layer 130 includes first through third color filter films 130R, 130G and 130B each disposed on the first through third pixels P1 through P3. The first color filter film 130R can include a pigment capable of absorbing the green and blue wavelength bands of light. The second color filter film 130G can include another pigment capable of absorbing the red and blue wavelength bands of light. The third color filter film 130B can include still another pigment capable of absorbing the red and green wavelength bands of light. To explain the first color film 130R as a representative example of the color filter films 130R, 130G and 130B, the green and blue wavelength bands of light, which is progressing at the side viewing angles, among light transmitted through the cholesteric color filter layer 120 of the first pixel P1 are filtered by the first color filter film 130R. Therefore, only the red color can be realized at the side viewing angles.

Although it is not shown in the drawings, the LCD 100 device according to the first embodiment of the present disclosure can further include an alignment layer disposed on the auxiliary color filter layer 130.

The second substrate 150 can be disposed to face the first substrate 110. The second substrate 150 can include a plurality of pixels. Although they are not shown in the drawings, gate lines and data lines crossing each other are formed to define the plurality of pixels of the second substrate 150. The second substrate 150 can further include thin film transistors which are disposed in the respective pixels and connected to the respective gate lines and data lines. Each of the thin film transistors can include a gate electrode disposed on the second substrate 150, an insulation layer disposed on an entire surface of the second substrate provided the gate electrode, a semiconductor layer disposed on the insulation layer opposite to the gate electrode, and source and drain electrodes arranged on the semiconductor layer and being separate from each other. The gate electrode can be electrically connected to the respective gate line, and the source electrode can be electrically connected to the respective data line. A protective layer (or a passivation layer) covering the thin film transistors can be additionally disposed on the second substrate 150. Besides, a pixel electrode connected to the respective thin film transistor and a common electrode can be arranged on the protective layer. The pixel electrode and the common electrode are used for forming a lateral electric field.

The liquid crystal layer 140 can be inserted between the first and second substrates 110 and 150 facing each other.

The LCD device 100 according to the first embodiment of the present disclosure can further include first and second polarizing films 160 and 170 which are disposed on outer surfaces of the first and second substrates 110 and 150, respectively. The first and second polarizing films 160 and 170 can have light transmission axes perpendicular to each other, respectively.

Moreover, the LCD device 100 according to the first embodiment of the present disclosure can include a backlight unit 180 configured to apply light toward the first substrate 110. The backlight unit 180 can include a light source 181 configured to emit light, a light guide plate 182 configured to guide light emitted from the light source 181 toward the first substrate 110, and a reflective plate 183 disposed under the 182 and configured to reflect losable light toward the light guide plate 183. It is explained that the LCD device 100 according to the first embodiment of the present disclosure includes an edge type backlight unit, but it is not limited to this.

Such a backlight unit 180 disposed under the first substrate 110 enables light to be previously transmitted through the cholesteric color filter layer 120 before passing through the liquid crystal layer 140. This results the fact that the polarization state of light is altered when passing through the liquid crystal layer 140 and furthermore the light transmittance of the LCD device 100 can deteriorate.

Although it is described that the backlight unit 180 is disposed under the first substrate 110, the LCD device 100 according to the first embodiment of the present disclosure is not limited to this. In other words, the backlight unit 180 can be disposed under the second substrate 150. In this case, in order to prevent the light transmittance of the LCD device 100, either an additional polarizing plate can be included in the LCD device the LCD device 100 or an altered optical design can be applied to the LCD device 100.

Also, although the LCD device is described is an IPS mode LCD device, it should be understood by the ordinary skilled person in the art that the present disclosure is not limited to this, but rather that the technical means of the present disclosure, i.e., a technical configuration enabling the polarization state of light passing through the light transmission portion to correspond to that being reflected by the light reflective portion using the of single retardation layer can be applied to LCD devices of TN mode, VA mode, OCB mode, and ECB mode.

In this manner, the LCD device according to the first embodiment of the present disclosure can enhance the light transmittance by including the cholesteric color filter layer. Also, the LCD device according to the first embodiment of the present disclosure can prevent the generation of a color shift because it includes the auxiliary color filter layer configured to filter every wavelength band of light except the fixed transmission wavelength band of light in the front direction of the cholesteric color filter layer among light progressing in the oblique direction of the cholesteric color filter layer. Therefore, the color reproductive ratio in accordance with the viewing angle can be enhanced.

Figure 3:
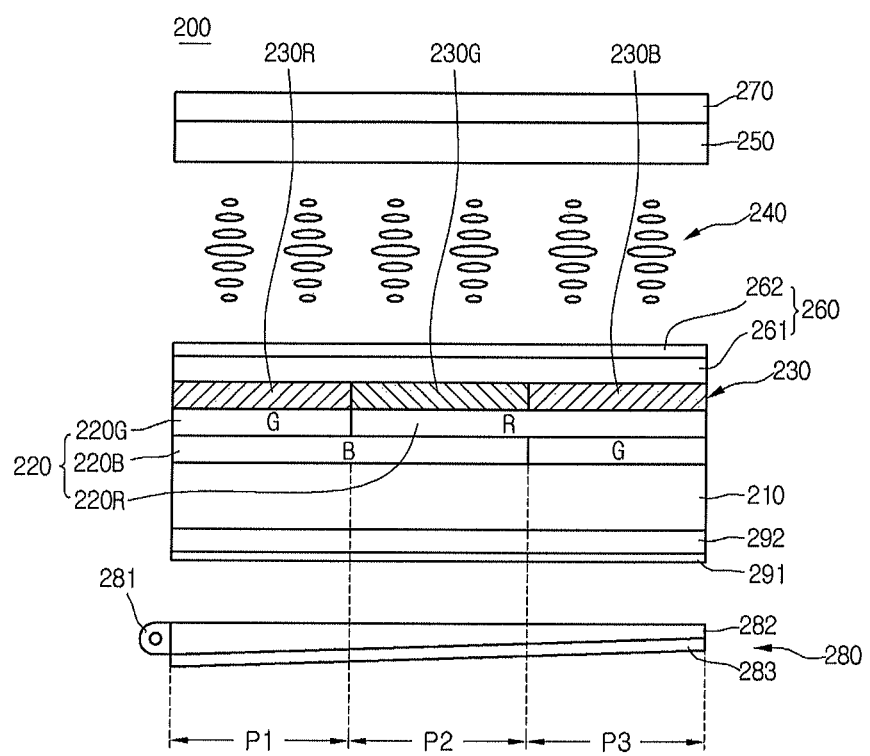
FIG. 3 is a cross-sectional view schematically showing an LCD device according to a second embodiment of the present disclosure.

FIG. 3 is a cross-sectional view schematically showing an LCD device according to a second embodiment of the present disclosure.

The LCD device of the first embodiment has the same configuration as that of the first embodiment described above, with the exception of further including a polarizing member. Accordingly, the description of the LCD device of the first embodiment to be repeated in that the LCD device of the second embodiment of the present disclosure will be omitted.

Referring to FIG. 3, the LCD device 200 according to the second embodiment of the present disclosure can include a first substrate 210, a second substrate 250, a liquid crystal layer 240, a cholesteric color filter layer 220 and an auxiliary color filter layer 230. The first and second substrates 210 and 250 are arranged to face each other. The liquid crystal layer 240 is inserted between the first and second substrates 210 and 250. The cholesteric color filter layer 220 is disposed on the first substrate 210. The auxiliary color filter layer 230 is disposed on the cholesteric color filter layer 220. Such an auxiliary color filter layer 230 transmits a fixed wavelength band of light progressing in just the front direction of the cholesteric color filter layer 220 and filters every wavelength band of light except the fixed wavelength band of light among light progressing to the side viewing angles of the cholesteric color filter layer 220.

The LCD device 200 according to the second embodiment of the present disclosure can further include a backlight unit 280. The backlight unit 280 applies light toward the liquid crystal layer 240 as well the first substrate 210.

If a first polarizing film 260 disposed on the outer surface of the first substrate 210 is included in the LCD device of the second embodiment, reflected light from the cholesteric color filter layer 220 is re-reflected by a reflective plate 293 after passing through the first polarizing film 260. Due to this, the reflexivity of light can deteriorate. In order to prevent the deterioration of light reflexivity, the first polarizing film 260 can be disposed on the auxiliary color filter layer 230.

In the LCD device 200 according to the second embodiment of the present disclosure, the first polarizing film 260 can be disposed on the cholesteric color filter 220, even though it is described that the first polarizing film 260 is disposed on the auxiliary color filter layer 230. This result is the reason why the first polarizing film 260 does not lower the reflexivity of light reflected by the cholesteric color filter 220.

The first polarizing film 260 can include a QWP (quarter wave plate) layer 261. The QWP changes circularly polarized light being transmitted through the cholesteric color filter layer 220 into linearly polarized light. The first polarizing film 260 can further include a wired grid polarizing layer 262 disposed on the QWP layer 261. Although it is described that the wired grid polarizing layer 262 is disposed on the QWP layer 261, the LCD device according to the second embodiment of the present disclosure is not limited to this. In other words, the LCD device according to the second embodiment of the present disclosure can furthermore include one of a different colorific (or double-colorific) polarizing layer and a carbon nanotube polarizing layer.

Also, the LCD device 200 according to the second embodiment of the present disclosure can include a second polarizing film 270 disposed on the second substrate 250. The second polarizing film 270 can have a light transmission axis perpendicular to that of the first polarizing film 250.

Moreover, the LCD device 200 according to the second embodiment of the present disclosure can include at least one of a DBEF (dual brightness enhancement film) 291 and a QWP 292, in order to enhance its light efficiency. The DBEF 291 can have not only a transmission axis transmitting a fixed direction of polarized light but also a reflection axis reflecting another direction of polarized light perpendicular to the fixed direction of polarized light. As such, the DBEF 291 not only transmits the fixed direction of polarized light but also reflects the different direction of polarized light perpendicular to the fixed direction of polarized light. For example, the DBEF 291 can transmit a P-wave but reflect an S-wave. Also, reflected light from the DBEF 291 can be transmitted through the DBEF 291 because of its being polarized when re-reflected by the reflective plate. Therefore, the LCD device including the DBEF 291 can reduce light loss.

The QWP 292 forces linearly polarized light to change into circularly polarized light. The QWP 292 applies the changed circularly-polarized-light to the cholesteric color filter layer 220 adapted to transmit circularly polarized light. Therefore, the light efficiency of the LCD device can be enhanced.

The polarization characteristics of light being transmitted through the LCD devices according to the embodiments of the present disclosure will now be explained referring to FIGS. 4 and 5. Since the LCD device of the first embodiment has a more enhanced light transmittance compared to that of the second embodiment, the LCD device of the second embodiment will be described as a representative example of the embodiments of the present disclosure.

Figure 4:
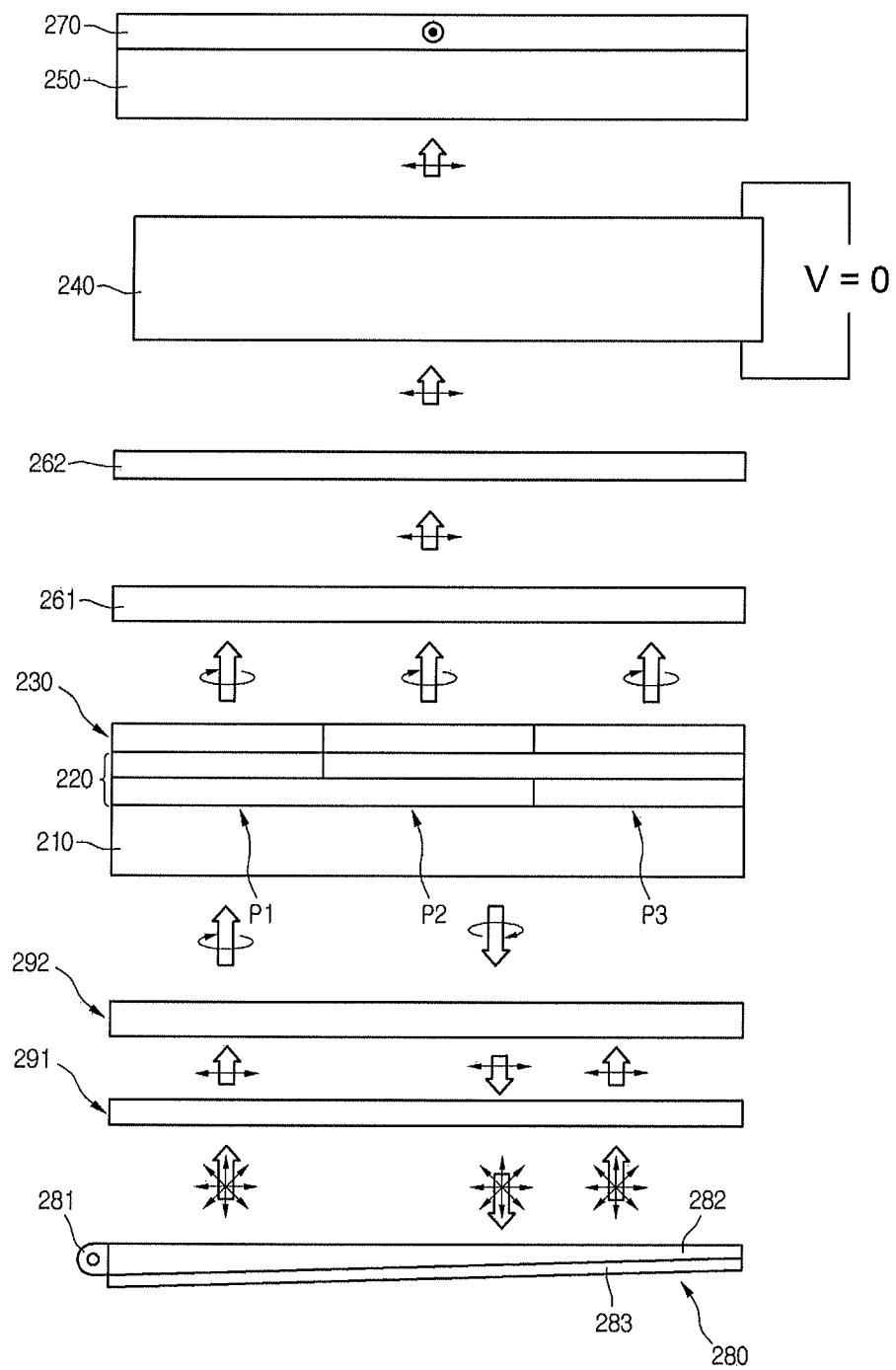
FIG. 4 is a cross-sectional view illustrating the polarization status of light in the LCD device when black is realized.

FIG. 4 is a cross-sectional view illustrating the polarization status of light in the LCD device when black is realized.

Referring to FIG. 4, among incident light from the backlight unit 280, linearly polarized light of 0° is transmitted through the DBEF 291 but linearly polarized light of 90 is reflected toward the reflective plate 283 by the DBEF 291. The reflected linearly-polarized-light can be used for displaying an image by being re-polarized when re-reflecting by the reflective plate 282 and by being applied to the DBEF291.

Also, light from the DBEF 291 can change from the linear polarization state of 0° into a left-circular polarization state while it is transmitted through the QWP 292. Among left-circularly polarized light from the QWP 292, two color wavelength bands of lights being the same as those of the cholesteric color filter layer 220 can be reflected by the cholesteric color filter layer 220 but one color wavelength band of light can be transmitted through the cholesteric color filter layer 220. For example, among left-circularly polarized light, the green wavelength band of light can be reflected by the green cholesteric color filter layer 220G of the first pixel P1 and the blue wavelength band of light can be reflected by the blue cholesteric color filter layer 220B of the first pixel P1, but the red wavelength band of light can be transmitted through the green and blue cholesteric color filter layers 220G and 220B. In this case, the reflected green and blue wavelength bands of lights from the green and blue cholesteric color filter layers 220G and 220B can be used for displaying an image by being reflected by the reflective plate 282.

Light transmitted through the cholesteric color filter layer 220 can originally maintain the left polarization state even though it passes through the auxiliary color filter layer 230.

Light transmitted through the cholesteric and auxiliary color filter layers 220 and 230 changes from the left polarization state into the linear polarization state of 0° while it passes through the QWP layer 261 of the first polarizing film 260. Light transmitted through the QWP layer 261 passes through the wired grid polarizing layer 262 in the state that it continues to maintain the linear polarization state of 0°. As such, the polarization degree of light passing through the wired grid polarizing layer 262 can be enhanced.

Light transmitted through the first polarizing film 260 can originally maintain the linear polarization state of 90° while it passes through the liquid crystal layer 240. Light transmitted through a powered-off liquid crystal layer 240 of a powered-off to which a supply voltage Vo is not applied. Linearly polarized light of 0 transmitted through the liquid crystal layer 250 cannot pass through the second polarizing film 270 with a polarization axis perpendicular to that of the first polarizing film 260. Accordingly, the LCD device 200 can realize a black.

FIG. 5 is a cross-sectional view illustrating the polarization status of light in the LCD device when white is realized. The polarization states of light in FIG. 5 are the same as those in FIG. 4 except that the polarization state of light changes when it is transmitted through the liquid crystal layer. Accordingly, the description of FIG. 4 to be repeated in that of FIG. 5 will be omitted.

Referring to FIG. 5, light emitted from the backlight unit 280 changes into linearly polarized light of 0 while it is transmitted through the DBEF 291, the QWP 292, the cholesteric color filter layer 220, the auxiliary color filter layer 230, and the first polarizing film 260.

Linear polarized light of 0° changes into elliptically polarized light while it passes through the liquid crystal layer 240 to which a supply voltage Vo is applied. Elliptically polarized light transmitted through the liquid crystal layer 240 also passes through the second polarizing film 270. In accordance therewith, the LCD device 200 can realize a white.

As described above, the LCD device according to the second embodiment of the present disclosure can enhance more of the light transmittance because it includes at least one of a QWP (Quarter Wave Plate) and a DBEF (Dual Brightness Enhancement Film).

Moreover, the LCD device according to the second embodiment of the present disclosure can enhance more of the light transmittance by including the polarizing film on the cholesteric color filter layer.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. An LCD device comprising:
   a first substrate;
   a second substrate disposed to face the first substrate;
   a liquid crystal layer inserted between the first and second substrates;
   a cholesteric color filter layer disposed on the first substrate; and
   an auxiliary color filter layer disposed on the cholesteric color filter layer that transmits a fixed wavelength band of light progressing in a front viewing direction of the cholesteric color filter layer and filters every wavelength band of light progressing in a side viewing direction of the cholesteric color filter layer except the fixed wavelength band of light,
   a first polarizing film disposed between the auxiliary color filter layer and the liquid crystal layer that changes a circular polarization state of light into a linear polarization state of light;
   wherein the first polarizing film includes,
   a QWP (quarter wave plate) layer contacted with an upper side of the auxiliary color filter layer;
   one of a wired grid polarizing layer, a different colorific (or double colorific) polarizing layer and a carbon nanotube polarizing layer contacted with an upper side of the QWP layer.

2. The LCD device as claim 1, wherein the first substrate includes first through third pixels configured to respectively realize red, green and blue colors, and wherein the cholesteric color filter layer enables a green wavelength band of light and a blue wavelength band of light to be reflected in a region corresponding to the first pixel, a red wavelength band of light and the blue wavelength band of light to be reflected in another region corresponding to the second pixel, and the red wavelength band of light and the green wavelength band of light to be reflected in still another region corresponds to the third pixel.

3. The LCD device as claim 1, wherein the auxiliary color filter layer includes color filters each formed of a pigment and a resin.

4. The LCD device as claim 1, further comprising:
a second polarizing film disposed on a surface of the second substrate and that has a light transmission axis crossing that of the first polarizing film.

5. The LCD device as claim 1, wherein the QWP layer changes left-circularly polarized light being transmitted through the cholesteric color filter layer and the auxiliary color filter layer into linearly polarized light of 0°, and wherein the polarizing layer originally transmits the changed linearly-polarized-light of 0°.

6. The LCD device as claim 1, further comprises a backlight unit disposed under the first substrate and configured to apply light toward the first substrate.

7. The LCD device as claim 6, further comprises at least one of a QWP (quarter wave plate) and a DBEF (dual brightness enhancement film) between the first substrate and the backlight unit.

8. The LCD device as claim 7, wherein the DBEF transmits linearly polarized light of 0° and reflects linearly polarized light of 90°, among light applied from the backlight unit, and wherein the QWP enables light to change from the linearly polarized state of 0° into a left-circularly polarized state.

* * * * *